United States Patent
Jiang et al.

(10) Patent No.: US 7,704,624 B2
(45) Date of Patent: Apr. 27, 2010

(54) FUEL CELL BIPOLAR PLATE, PROCESS FOR PRODUCING THE SAME, AND FUEL CELL INCLUDING THE BIPOLAR PLATE

(75) Inventors: Jianye Jiang, Takaishi (JP); Tetsuya Harada, Takaishi (JP); Takayuki Miki, Takaishi (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 12/162,047

(22) PCT Filed: Jan. 24, 2007

(86) PCT No.: PCT/JP2007/051053

§ 371 (c)(1),
(2), (4) Date: Jul. 24, 2008

(87) PCT Pub. No.: WO2007/086404

PCT Pub. Date: Aug. 2, 2007

(65) Prior Publication Data

US 2009/0197140 A1    Aug. 6, 2009

(30) Foreign Application Priority Data

Jan. 25, 2006    (JP)    ............... 2006-016652

(51) Int. Cl.
*H01M 2/00* (2006.01)
*H01M 2/02* (2006.01)
(52) U.S. Cl. ............... 429/34; 429/38; 429/39
(58) Field of Classification Search ............ 429/34, 429/38, 39
See application file for complete search history.

(56) References Cited

FOREIGN PATENT DOCUMENTS

| EP | 1667262 A1 | 6/2006 |
|----|-----------|--------|
| JP | 60-37670 A | 2/1985 |
| JP | 63-294610 A | 12/1988 |

(Continued)

OTHER PUBLICATIONS

International Search Report of PCT/JP2007/051053, date of mailing Apr. 17, 2007.

*Primary Examiner*—Patrick Ryan
*Assistant Examiner*—Ben Lewis
(74) *Attorney, Agent, or Firm*—Westerman, Hattori, Daniels & Adrian, LLP

(57) ABSTRACT

A fuel cell bipolar plate that while retaining its mechanical strength, has its electrical conductivity enhanced; a process for producing the same; and a fuel cell including the bipolar plate. There is provided a fuel cell bipolar plate comprising laminated molded item formed by a sheet-shaped molding material, wherein the sheet-shaped molding material contains a resin and a carbon material, and wherein the laminated molded item has a laminate structure of, arranged in sequence, surface layer C/inner layer B/central layer A/inner layer B'/surface layer C', and wherein each of the central layer A, inner layer B, inner layer B', surface layer C and surface layer C' consists of a single layer or multilayer of the sheet-shaped molding material, and wherein when the carbon material content of central layer A is referred to as a, the carbon material content of inner layer B as b, the carbon material content of inner layer B' as b', the carbon material content of surface layer C as c and the carbon material content of surface layer C' as c', there are satisfied the relationships $55 \leq a \leq 85$, $55 \leq c \leq 85$, $55 \leq c' \leq 85$, $10 \leq a-b \leq 30$, $10 \leq c-b \leq 30$, $10 \leq a-b' \leq 30$ and $10 \leq c'-b' \leq 30$ (the unit of each of a, b, b', c and c' is % by volume).

9 Claims, 2 Drawing Sheets

FOREIGN PATENT DOCUMENTS

| | | |
|---|---|---|
| JP | 1-154467 A | 6/1989 |
| JP | 2-281567 A | 11/1990 |
| JP | 2000-323150 A | 11/2000 |
| JP | 2000323150 * | 11/2000 |
| JP | 2001-52721 A | 2/2001 |
| JP | 2001-126744 A | 5/2001 |
| JP | 2002-75397 A | 3/2002 |
| JP | 2003-151574 A | 5/2003 |
| JP | 2005-71933 A | 3/2005 |
| JP | 2005-100703 A | 4/2005 |
| JP | 2005-122974 A | 5/2005 |
| JP | 2006-332035 A | 12/2006 |
| WO | 2005027248 A1 | 3/2005 |

* cited by examiner

FUEL CELL BIPOLAR PLATE, PROCESS FOR PRODUCING THE SAME, AND FUEL CELL INCLUDING THE BIPOLAR PLATE

TECHNICAL FIELD

The present invention relates to a fuel cell bipolar plate usable for a fuel cell such as a phosphoric acid fuel cell, a direct methanol type fuel cell or a solid polymer electrolyte fuel cell applied to a power source for an electric automobile, a portable power source or an emergency electric power source and a process for producing the same, as well as a fuel cell including the same.

BACKGROUND ART

In relation to a fuel cell electrically powered by electrochemical reaction between hydrogen and oxygen, various applications to portable apparatuses, automobiles etc. have been studied. The fuel cell has a structure obtained by stacking several 10 to several 100 basic constitutional units, i.e., unit cells each consisting of an electrolyte membrane, an electrode and a bipolar plate. In a process for producing a general fuel cell, the electrolyte membrane and the electrode are previously formed as an electrolyte membrane/electrode assembly (MEA), and the bipolar plate is arranged thereon. The bipolar plate is provided with passages for supplying fuel gas such as hydrogen gas, an oxidizer consisting of air or oxygen and a coolant for cooling the cell respectively on at least a single surface thereof.

While the bipolar plate must be sufficiently conductive in order to improve power generation efficiency of the fuel cell by ensuring electric connection with the adjacent MEA, sufficient mechanical strength is required in addition thereto, in order to support the laminated structure of the unit cell. Further, reduction in the thickness of the bipolar plate has also been recently required following the requirement for downsizing of the fuel cell. In addition, improvement in thickness accuracy is also required in order to reduce contact resistance between the unit cells in the laminated structure of the unit cells.

As a method for improving the electrical conductivity of a fuel cell bipolar plate, a method increasing the content of a carbon material in a molded item containing at least the carbon material and a resin binder can be listed. While the electrical conductivity can be improved by this method, the mechanical strength of the bipolar plate tends to lower if the content of the carbon material is excessively increased, and hence the ratio between the carbon material and the resin binder has generally been designed on the basis of the balance between the electrical conductivity and the mechanical strength of the bipolar plate in the actual situation.

Thus, there are proposed various techniques for improving both of the electrical conductivity and the mechanical strength of the fuel cell bipolar plate and techniques related to a fuel cell bipolar plate reduced in thickness.

Japanese Patent Laying-Open No. 63-294610 (Patent Document 1) proposes a conductive molded plate prepared by introducing thermosetting resin and carbon powder into a porous sheet of organic fiber or ceramic fiber in communication in the thickness direction of the sheet so that the electric specific resistance of the sheet is not more than 10 Ωm in the thickness direction.

Japanese Patent Laying-Open No. 2000-323150 (Patent Document 2) proposes a fuel cell bipolar plate or the like made of resin containing micro members of a carbon material for ensuring sufficient electrical conductivity by containing a larger quantity of the micro members in the outer surface as compared with the inner part and ensuring sufficient strength by forming the inner part by resin containing a small quantity of the micro members.

Japanese Patent Laying-Open No. 2001-126744 (Patent Document 3) proposes a fuel cell bipolar plate having a conductive material at least on a single surface or in the inner part of a synthetic resin molded item of graphite particles including coarse graphite particles of at least 40 to 120 μm in average particle diameter (D50%) and non-carbonaceous resin and exhibiting high electrical conductivity, mechanical strength, thermal conductivity, high dimensional accuracy and the like.

Japanese Patent Laying-Open No. 2001-52721 (Patent Document 4) proposes a fuel cell bipolar plate constituted of graphite particles and at least a single type of non-carbonaceous resin selected from thermosetting resin and thermoplastic resin with the graphite particles including coarse graphite particles of at least 40 to 120 μm in average particle diameter (D50%) and a conductor covering at least a single surface of this molded item to be excellent in gas impermeability, mechanical strength, electrical conductivity in the thickness direction and the like.

With respect to the requirement for downsizing and reduction in thickness, Japanese Patent Laying-Open No. 2005-100703 (Patent Document 5) proposes a conductive molding material, prepared by wet-forming a slurry obtained by suspending a carbonaceous base material and thermoplastic resin fiber in water and sheeting and molding the same, containing the carbonaceous base material (A) and the thermoplastic resin fiber (B) as essential ingredients with the ratio A/B (mass ratio) of 90/10 to 62/38.

Although the electrical conductivity and the mechanical strength of the fuel cell bipolar plate can be rendered compatible with each other to some extent according to each of the methods described in Patent Documents 1 to 4, these performances are not yet highly exhibited in a well-balanced manner. While a bipolar plate downsizeable and reducible in thickness can be obtained according to the method described in Patent Document 5, this method does not disclose a bipolar plate simultaneously satisfying the electrical conductivity and the mechanical strength.

Patent Document 1: Japanese Patent Laying-Open No. 63-294610
Patent Document 2: Japanese Patent Laying-Open No. 2000-323150
Patent Document 3: Japanese Patent Laying-Open No. 2001-126744
Patent Document 4: Japanese Patent Laying-Open No. 2001-52721
Patent Document 5: Japanese Patent Laying-Open No. 2005-100703

DISCLOSURE OF THE INVENTION

Problems to be Solved by the Invention

In order to solve the aforementioned problems, an object of the present invention is to provide a fuel cell bipolar plate improved in electrical conductivity and reduced in thickness while retaining excellent mechanical strength and a process for producing the same, as well as a small-sized fuel cell including the fuel cell bipolar plate.

Means for Solving the Problems

The inventor has found that a fuel cell bipolar plate retaining mechanical strength and electrical conductivity in a well-balanced manner can be obtained by molding a sheet-shaped molding material obtained by further stacking highly conductive sheet-shaped molding materials on both surfaces of a laminated sheet material, electrically conductive and excellent in mechanical strength, obtained by stacking sheet-shaped molding materials having high mechanical strength on both surfaces of a highly conductive sheet-shaped molding material, to complete the present invention.

In other words, the present invention relates to a fuel cell bipolar plate comprising a laminated molded item formed by a sheet-shaped molding material, in which the sheet-shaped molding material contains resin and a carbon material, the laminated molded item has a laminated structure of surface layer C/inner layer B/central layer A/inner layer B'/surface layer C' arranged in this sequence, each of the central layer A, the inner layers B and B' and the surface layers C and C' consists of a single layer or a multilayer of the sheet-shaped molding material, and the carbon material content a in the central layer A, the carbon material content b in the inner layer B, the carbon material content b' in the inner layer B', the carbon material content c in the surface layer C and the carbon material content c' in the surface layer C' satisfy the following relationships:

$$55 \leq a \leq 85$$

$$55 \leq c \leq 85$$

$$55 \leq c' \leq 85$$

$$10 \leq a-b \leq 30$$

$$10 \leq c-b \leq 30$$

$$10 \leq a-b' \leq 30$$

$$10 \leq c'-b' \leq 30$$

(where the unit of a, b, b', c and c' is volume %).

The present invention also relates to the fuel cell bipolar plate, in which the carbon material content a in the central layer A, the carbon material content c in the surface layer C and the carbon material content c' in the said surface layer C' satisfy the following relationships:

$$0 \leq c-a$$

$$0 \leq c'-a$$

The present invention also relates to the fuel cell bipolar plate, in which the thicknesses of both of the aforementioned surface layer C and the surface layer C' are in the range of 1/40 to 1/5 of the thickness of the aforementioned laminated molded item.

The present invention also relates to the fuel cell bipolar plate, in which the thicknesses of both of the aforementioned surface layer C and the surface layer C' are in the range of 1/20 to 1/10 of the thickness of the aforementioned laminated molded item.

The present invention also relates to the fuel cell bipolar plate, in which the thicknesses of both of the aforementioned inner layer B and the inner layer B' are in the range of 1/20 to 2/5 of the thickness of the aforementioned laminated molded item.

The present invention also relates to the fuel cell bipolar plate, in which the aforementioned sheet-shaped molding material is prepared by forming a carbon particle layer on at least one surface of a resin sheet.

The present invention further relates to a process for producing a fuel cell bipolar plate for obtaining the aforementioned fuel cell bipolar plate, including the steps of stacking sheet-shaped molding materials constituting the respective ones of the central layer A, the inner layers B and B' and the surface layers C and C' into a laminated structure of surface layer C/inner layer B/central layer A/inner layer B'/surface layer C' arranged in this sequence, and forming the laminated molded item by heating and pressure-molding the stacked sheet-shaped molding materials.

The present invention further relates to a fuel cell including the aforementioned fuel cell bipolar plate.

Effects of the Invention

According to the present invention, a fuel cell bipolar plate provided with excellent electrical conductivity and reduced in thickness without remarkably damaging mechanical strength is obtained, and a fuel cell can be downsized by employing this bipolar plate.

DESCRIPTION OF THE REFERENCE SIGNS 1 laminated molded item, 11 surface layer C, 12 inner layer B, 13 central layer A, 14 inner layer B', 15 surface layer C', 2, 31 fuel cell bipolar plate, 3 fuel cell, 32 fuel electrode, 33 oxidizer electrode, 34 solid polymer electrolyte membrane, 35 electrolyte membrane/electrode assembly.

BEST MODES FOR CARRYING OUT THE INVENTION

The fuel cell bipolar plate according to the present invention comprises a laminated molded item obtained by stacking sheet-shaped molding materials containing resin and a carbon material.

The sheet-shaped molding materials containing the resin and the carbon material are preferable for ensuring excellent electrical conductivity and thinness of the bipolar plate.

The fuel cell bipolar plate according to the present invention comprises a laminated molded item obtained by stacking diverse sheet-shaped molding materials whose carbon material contents are adjusted and molding the same.

Figure 1:
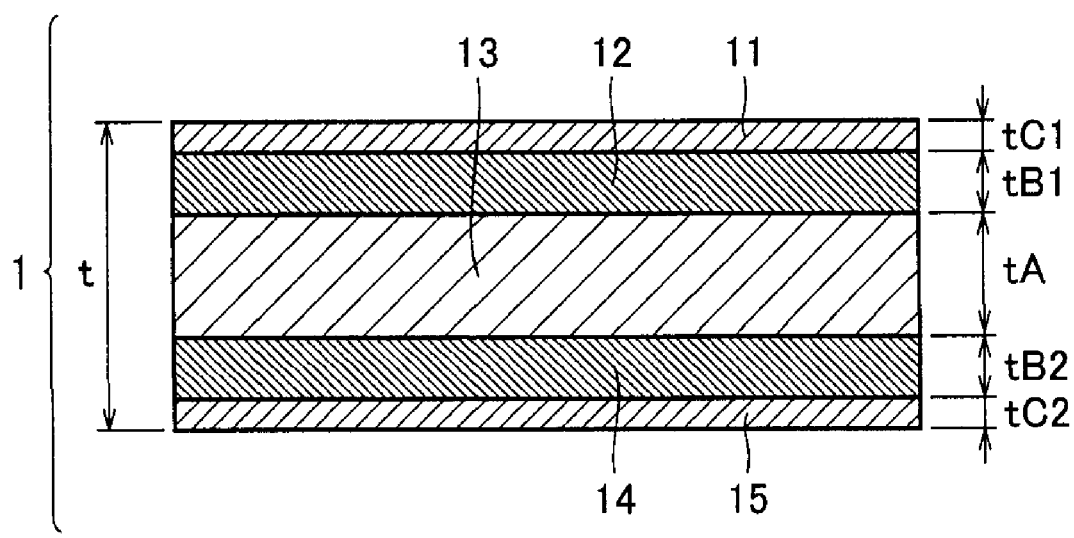
FIG. 1 is a sectional view illustrating the structure of a laminated molded item constituting a fuel cell bipolar plate according to the present invention.

FIG. 1 is a sectional view for illustrating the structure of a laminated molded item constituting the fuel cell bipolar plate according to the present invention. The laminated molded item 1 constituting the fuel cell bipolar plate according to the present invention has a structure obtained by stacking a surface layer C 11, an inner layer B 12, a central layer A 13, inner layer B' 14 and surface layer C' 15 in this sequence. In the present invention, each of central layer A, inner layers B and B' and surface layers C and C' may be a single layer or a multilayer of at least two layers, and may be formed by stacking a single type of sheet-shaped molding materials or stacking at least two types of different sheet molding materials in the case of the multilayer.

In the present invention, the carbon material content a in central layer A, the carbon material content b in inner layer B, the carbon material content b' in inner layer B', the carbon material content c in surface layer C and the carbon material content c' in surface layer C' are so adjusted as to satisfy the following relationships:

$$55 \leq a \leq 85$$

$$55 \leq c \leq 85$$

$$55 \leq c' \leq 85$$

$$10 \leq a-b \leq 30$$

$$10 \leq c-b \leq 30$$

$$10 \leq a-b' \leq 30$$

$$10 \leq c'-b' \leq 30$$

(where the unit of a, b, b', c and c' is volume %). When at least any of central layer A, inner layers B and B' and surface layers C and C' is constituted of multilayer sheet-shaped molding materials, the contents a, b, b', c and c' denote the averages of the quantities of the carbon materials in the multilayer sheet-shaped molding materials, unless otherwise stated.

In a molded item including a molding material containing resin and a carbon material, mechanical strength and electrical conductivity remarkably vary with the ratio between the resin and the carbon material. When the ratio of the resin increases, there is such a tendency that the mechanical strength of the molded item rises while the electrical conductivity lowers. When the ratio of the carbon material increases, there is such a tendency that the electrical conductivity of the molded item rises while the mechanical strength lowers.

The present invention relates to a fuel cell bipolar plate including a laminated molded item obtained by stacking sheet-shaped molding materials and having such a structure that inner layers B and B' having smaller carbon material contents than central layer A in a constant range are formed on both surfaces of central layer A and surface layers C and C' having larger carbon contents than inner layers B and B' in a constant range are further formed on both surfaces thereof, so that both mechanical strength and electrical conductivity are improved.

The aforementioned carbon content a in central layer A, the carbon content c in surface layer C and the carbon content c' in surface layer C' preferably satisfy the following relationships:

$$0 \leq c-a$$

$$0 \leq c'-a$$

in order to improve the electrical conductivity. In other words, the carbon content c in surface layer C and the carbon content c' in surface layer C' are preferably identical to or larger than the carbon material content a in central layer A. The electrical conductivity of the bipolar plate is more remarkably influenced by the electrical conductivity on the surface than that in the inner part of the bipolar plate, whereby it is effective to form materials having high electrical conductivity on the surfaces of the bipolar plate, in order to improve the electrical conductivity of the bipolar plate. In the present invention, the surface layers having high electrical conductivity are so provided on the surfaces that higher electrical conductivity is provided while ensuring the mechanical strength of the overall bipolar plate with the inner layers. If the contents c and c' are smaller than the content a, the effect of improving the electrical conductivity of the overall bipolar plate may not be sufficiently attained.

The electrical conductivity of the bipolar plate can be rendered excellent by stacking central layer A and surface layers C and C' having relatively large carbon material contents while ensuring the mechanical strength of the bipolar plate in the sufficient range with the inner layers B and B' having relatively small carbon material contents, due to the aforementioned structure.

In other words, the effect of improving the electrical conductivity of the overall laminated molded item is remarkably attained when the layers having relatively high carbon material contents are present on the surface portions in the thickness direction than the central portion, whereby the mechanical strength and the electrical conductivity are simultaneously improved by forming the layers having relatively high carbon material contents in the range not reducing the mechanical strength by inner layers B and B' in addition to the central portion.

The carbon material content a (volume %) in central layer A and the carbon material contents c and c' (volume %) in surface layers C and C' are at least 55 volume % and not more than 85 volume %. Sufficient electrical conductivity is not supplied to the bipolar plate if the content a (volume %) and the contents c and c' (volume %) are smaller than 55 volume %, while the strength of the overall bipolar plate cannot be sufficiently attained due to low mechanical strength of central layer A if the contents a, c and c' are larger than 85 volume %. The content a (volume %) and the contents c and c' (volume %) are more preferably set to at least 60 volume %, further preferably to at least 70 volume %. If central layer A and surface layers C and C' are formed as multilayers, the content a (volume %) and the contents c and c' (volume %) may be in the aforementioned range as the overall central layer A and the overall surface layers C and C', while the content a and the contents c and c' in all of the sheet-shaped molding materials constituting the respective layers of central layer A and surface layers C and C' are more preferably in the aforementioned range.

In the present invention, the differences (a–b) and (a–b') (volume %) between the carbon content a (volume %) in central layer A and the carbon contents b and b' (volume %) in inner layers B and B' and the differences (c–b) and (c'–b') (volume %) between the carbon contents c and c' (volume %) in surface layers C and C' and the carbon contents b and b' (volume %) in inner layers B and B' are at least 10 volume % and not more than 30 volume % respectively. If the values (a–b) and (a–b') (volume %) and the values (c–b) and (c'–b') (volume %) are smaller than 10 volume %, the effect of improving the electrical conductivity and the mechanical strength of the overall bipolar plate by varying the carbon contents in central layer A and surface layers C and C' and inner layers B and B' may not be sufficiently attained. If the values (a–b) and (a–b') (volume %) and the values (c–b) and (c'–b') (volume %) are larger than 30 volume %, delamination may be caused between central layer A and surface layers C and C' and between inner layers B and B' and surface layers C and C' due to remarkably different material compositions of central layer A and surface layers C and C' and inner layers B and B', and the carbon material contents in inner layers B and B' may be so extremely reduced that the electrical conductivity of the overall bipolar plate cannot be sufficiently attained. The values (a–b) and (a–b') (volume %) and the values (c–b) and (c'–b') (volume %) are preferably at least 15 volume % respectively, and preferably not more than 25 volume % respectively. If at least any of central layer A, inner layers B and B' and surface layers C and C' is formed by a multilayer, the values (a–b) and (a–b') (volume %) and the values (c–b) and (c'–b') (volume %) may be in the aforementioned range as the whole of central layer A, inner layers B and B' and surface layers C and C', while the relationships between the content a, the contents b and b' and the contents c and c' in an arbitrary combination of sheet-shaped molding materials constituting the respective layers of the multilayer in central layer A, inner layer B or B' or surface layer C or C' are more preferably in the aforementioned range.

The carbon content in the overall laminated molded item according to the present invention is preferably in the range of at least 60 volume % and less than 85 volume %. The electrical conductivity in employment as the bipolar plate is excellent if the content is at least 60 volume %, while the mechanical strength and gas sealability in employment as the bipolar plate are excellent if the content is less than 85 volume %. The carbon content in the overall laminated molded item is more preferably at least 70 volume %, further preferably at least 75 volume %.

As a method of measuring the carbon contents in the respective layers of central layer A, inner layers B and B' and surface layers C and C' of the laminated molded item obtained by employing sheet-shaped molding materials, a method performing cross-sectional observation with an optical microscope, reading ratios (area %) of the areas of carbon material portions occupying the observation field by image analysis and calculating the ratios as the carbon material contents (volume %), for example, can be employed.

In the present invention, the bending strength of inner layers B and B' is preferably in the range of 30 to 70 MPa, If the bending strength of inner layers B and B' is in the range of 30 to 70 MPa, the mechanical strength of the overall bipolar plate is ensured while the electrical conductivity of inner layers B and B' is not remarkably reduced, whereby the electrical conductivity of the overall bipolar plate is excellently retained. The bending strength of inner layers B and B' is more preferably at least 40 MPa, further preferably at least 50 MPa. The bending strength is measured by a method according to JIS K-6911, for example.

In the present invention, the volume resistivity of surface layers C and C' is preferably in the range of 2.0 to 10.0 mΩ·cm. If the volume resistivity is in the range of 2.0 to 10.0 mΩ·cm, the electrical conductivity necessary for the bipolar plate can be ensured while retaining the mechanical strength of the bipolar plate. The volume resistivity is particularly preferably not more than 8.0 mΩ·cm. The aforementioned volume resistivity can be obtained according to JIS C-2525-1999, for example.

In the present invention, the thickness tA of central layer A 13 shown in FIG. 1 is preferably in the range of 1/5 to 2/5 of the thickness t of laminated molded item 1, for example. The electrical conductivity of the overall bipolar plate is excellent if the thickness of central layer A is at least 1/5 of the laminated molded item, while the mechanical strength of the overall bipolar plate is excellent since at least constant thicknesses of inner layers B and B' can also be ensured if the thickness is not more than 2/5. In this case, the electrical conductivity and the mechanical strength of the overall bipolar plate are excellently rendered compatible with each other.

In the present invention, the thicknesses tB1 and tB2 of inner layer B 12 and surface layer B' 14 shown in FIG. 1 are preferably in the range of 1/20 to 2/5, more preferably 1/15 to 2/5, particularly preferably 1/10 to 2/5 of the thickness t of laminated molded item 1, for example. The mechanical strength of the overall bipolar plate is excellent if the thicknesses of inner layer B and surface layer B' are at least 1/20 of the thickness of the laminated molded item, while the electrical conductivity of the overall bipolar plate is excellent if the thicknesses are not more than 2/5.

In the present invention, the thicknesses tC1 and tC2 of surface layer C 11 and surface layer C' 15 shown in FIG. 1 are preferably in the range of 1/40 to 1/5 of the thickness t of laminated molded item 1, for example. The electrical conductivity of the overall bipolar plate is excellent if the thicknesses of surface layer C and surface layer C' are at least 1/40 of the thickness of the laminated molded item, while reduction in the mechanical strength of the overall bipolar plate, particularly on the bipolar plate surfaces can be prevented if the thicknesses are not more than 1/5. The thicknesses tC1 and tC2 of surface layer C11 and surface layer C' 15 are particularly preferably in the range of 1/20 to 1/10 of the thickness t of laminated molded item 1.

The thickness of the fuel cell bipolar plate according to the present invention is preferably designed in the range of 0.2 to 2.0 mm. If the thickness is in the range of 0.2 to 2.0 mm, a thin bipolar plate having particularly excellent gas sealability can be obtained.

While (1) a material prepared by bonding a granular carbon material to at least one surface of a resin sheet thereby forming a carbon particle layer and (2) a material prepared by mixing resin and a carbon material with each other so that a granular carbon material is dispersed in a resin sheet can be listed as the material for the sheet-shaped molding material used in the present invention, the former material (1) is preferably employed.

While the aforementioned sheet-shaped molding material (2) is prepared by dispersing the carbon material in the sheet by compression-molding or injection-molding the mixture of the carbon material and the resin in a flowing state and it is difficult to increase the carbon material content in excess of a constant level due to the necessity for ensuring flowability, the carbon material content in the sheet-shaped molding material can be increased to a desired degree and excellent thickness accuracy can also be ensured when the aforementioned sheet-shaped molding material (1) having the carbon particle layer formed on the surface is employed, whereby the bipolar plate can be reduced in thickness as a result.

The sheet-shaped molding material (1) can be formed by a method sprinkling the granular carbon material onto the resin sheet and thereafter heating/melting the resin sheet for bonding the carbon material to the sheet, for example. This sheet-shaped molding material (1) can be formed as a conductive sheet-shaped molding material without performing an operation of bringing the mixture of the resin and the carbon material into a flowing state, whereby carbon material particles are less damaged and the number of points where the carbon material particles come into contact with each other is reduced in the sheet-shaped molding material as compared with the sheet-shaped molding material (2), so that the effect of improving the electrical conductivity is attained. While the carbon particle layer in the sheet-shaped molding material (1) may be formed on only a single surface or both surfaces of the resin sheet, this layer is preferably formed on the single surface of the resin sheet in consideration of handleability.

When the sheet-shaped molding material (1) is employed, central layer A, inner layers B and B' and surface layers C and C' are preferably provided in multilayer structures respectively in a point of obtaining a molded item having a sufficient thickness in order to ensure practicalness of the bipolar plate and a point that the carbon contents per unit area can be increased in the central layer, the inner layers and the surface layers. For example, a laminated molded item in which the respective ones of central layer A, inner layers B and B' and surface layers C and C' are provided in single-layer or multi-layer structures of sheet-shaped molded materials having thicknesses in the range of 100 to 400 µm is preferably employed in the present invention.

In the laminated molded item constituting the fuel cell bipolar plate according to the present invention, the types of the used sheet-shaped molding materials may be different from each other, and the numbers etc. of the sheet-shaped molding materials constituting the layers may be different from each other in two inner layers B and B' formed to hold central layer A therebetween and two surface layers C and C' formed on the outer sides of inner layers B and B', so far as the carbon contents are set in the prescribed ranges of the present invention. In this case, excellent shape stability etc. are attained when the laminated molded item has a symmetrical structure with respect to the center in the thickness direction, and hence inner layer B and inner layer B' preferably have the same structure, and surface layer C and surface layer C' preferably have the same structure. Particularly when inner layers B and B' and/or surface layers C and C' are brought into multilayer structures respectively, inner layers B and B' and surface layers C and C' are preferably arranged to be completely symmetrical with respect to the center in the thickness direction in view of the materials, the numbers of stacked sheets etc.

For example, artificial graphite, natural graphite, glassy carbon, carbon black, acetylene black, ketjen black or the like can be listed as the aforementioned carbon material. One of these carbon materials or a combination of at least two of these carbon materials can be employed. Expanded graphite obtained by chemically treating graphite can also be used. In consideration of the electrical conductivity, artificial graphite, natural graphite or expanded graphite is preferable in a point that a bipolar plate having high electrical conductivity is obtained with a smaller quantity.

Granular powder is preferable as the form of these carbon materials. The average particle diameter of the granular powder of the carbon material is preferably in the range of 1 to 800 µm, particularly preferably in the range of 50 to 600 µm in view of the balance between the electrical conductivity and the mechanical property. The shape of the granular powder of the carbon material is not restricted but may be any of a foil shape, a scaly shape, a plate shape, a needle shape, a spherical shape or an amorphous shape.

A thermosetting resin sheet or a thermoplastic resin sheet can be listed as the resin sheet used for the aforementioned sheet-shaped molding material (1). As the thermosetting resin for such a thermosetting resin sheet, phenol resin, epoxy resin, vinyl ester resin, urea resin, melamine resin, unsaturated polyester resin, silicone resin, diallyl phthalate resin, maleimide resin, polyimide resin or the like can be listed, for example.

Not only a thermosetting resin sheet of a single type of resin but also a sheet obtained by mixing at least two types of resin materials with each other or a composite sheet obtained by forming at least two types of resin materials in a layered manner can also be used as the thermosetting resin sheet. The thermosetting resin sheet can be obtained by preparing a resin solution by diluting thermosetting resin and a curing catalyst with a solvent, applying this solution onto separate paper or the like and thereafter removing the solvent from the coating film by performing heating or decompression. This resin sheet is used in an uncured state, to be finally cured in a bipolar plate molding step.

As the thermoplastic resin for the thermoplastic resin sheet, polyethylene, polypropylene, a cycloolefin polymer, polystyrene, polyvinyl chloride, ABS resin, polyamide resin, polyacetal, polycarbonate, polyphenylene ether, polyethylene terephthalate, polytrimethylene terephthalate, polybutyrene terephthalate, policyclohexylene terephthalate, poly(phenylene sulfide), poly(thioether sulfone), polyether ether ketone, polyalylate, polysulfone, poly(ether sulfone), poly (ether imide), poly(amide imide), thermoplastic polyimide, a liquid crystal polymer, a polytetrafluoroethylene copolymer, fluororesin such as poly(vinylidene fluoride), polyester, polylactic acid or a thermoplastic elastomer such as a polyester-polyester elastomer or a polyester-polyether elastomer can be listed, for example.

Similarly to the thermosetting resin sheet, not only a thermoplastic resin sheet of a single type of resin but also a sheet obtained by mixing at least two types of resin materials with each other or a composite sheet obtained by forming at least two types of resin materials in a layered manner can also be used as the thermoplastic resin. Further, a composite sheet of the thermosetting resin and the thermoplastic resin can also be used.

The aforementioned resin can be properly selected and employed in response to heat resistance and durability with respect to the operating temperature of the fuel cell to which the resin is applied. For example, poly(phenylene sulfide) resin is preferable when the resin is applied to a phosphoric acid fuel cell, for example, in view of corrosion resistance and heat resistance, while polyolefin resin such as poly(phenylene sulfide) resin or polypropylene, for example, is preferable when the resin is applied to a solid polymer electrolyte fuel cell in view of corrosion resistance and mechanical strength.

In the present invention, a sheet-shaped molding material prepared from the aforementioned resin can be formed and employed. For example, poly(phenylene sulfide) resin is preferable when the carbon material is bonded by heating and pressure molding at a temperature exceeding the melting point, in points that the resin melt has strong affinity to the carbon material, the carbon material is homogeneously dispersed in the sheet-shaped molding material, and the electrical conductivity and the mechanical strength of the overall bipolar plate can be improved.

The sheet-shaped molding material used in the present invention may be constituted of only the resin and the carbon material, while the same may contain still another nonconductive or semiconductive material in the range not damaging desired characteristics of the sheet-shaped molding material. As such a material, calcium carbonate, silica, kaolin, clay, talc, mica, glass flakes, glass beads, glass powder, hydrotalcite, wollastnite or the like can be listed as nonconductive granular powder, for example. Further, zinc oxide, tin oxide, titanium oxide or the like can be listed as semiconductive granular powder, for example.

While nonwoven fabric, fabric or a film can be listed as the material for the resin sheet, a material having proper voids is particularly preferable. Nonwoven fabric is preferable employed as such a material having proper voids. The nonwoven fabric denotes a structure obtained by bonding or intertwining fiber materials made of the aforementioned resin by a chemical or mechanical method or a combination of chemical and mechanical methods, for example. More specifically, a structure obtained by bonding fiber materials to each other with an adhesive, a structure obtained by mechanically bonding fiber materials to each other by needle punching or a structure such as spunbonded fabric obtained by bonding fiber materials to each other by direct melting, for example. In order to uniformize the thickness of the nonwoven fabric, nonwoven fabric such as spunbonded fabric obtained by bonding fiber materials to each other by direct melting is preferably employed.

As the resin constituting the nonwoven fabric, thermoplastic resin is particularly preferable in a point that the same is easy to fiberize. Particularly when a method of bonding fiber materials to each other by melting the fiber materials as in spunbonded fabric, fiber materials of thermoplastic resin must be employed.

The fiber for forming the nonwoven fabric may be constituted of a single type of fiber material, or may be constituted of at least two types of fiber materials different in shape and/or material composition from each other.

While the aforementioned nonwoven fabric may simply be capable of holding the carbon material, nonwoven fabric consisting of fiber materials having a diameter in the range of 1 to 200 µm is preferably used in general.

While the characteristics of the resin sheet such as the shape of the voids and the porosity can be properly designed in response to the target properties of the bipolar plate, openings of the voids are preferably present on the surface of the resin sheet in a point that a sheet-shaped molding material containing a larger quantity of the carbon material can be easily prepared. The porosity (%) of the resin sheet expressed in the following formula:

Porosity (%) of resin sheet=(1−(true volume of resin sheet)/(apparent volume of resin sheet))×100(%)

is preferably in t range of 30 to 90%. Bondability of the carbon material is improved if the porosity is at least 30%, while a sheet-shaped molding material excellent in handleability can be obtained if the porosity is not more than 90%. The porosity is more preferably in the range of 70 to 85%. The true volume of the resin sheet can be calculated by measuring the mass of the resin sheet and dividing the obtained value by the specific gravity of the sheet. The apparent volume of the resin sheet is calculated from the measured values of the apparent thickness, the width and the length of the sheet. When the sheet has the openings of the voids on the surface thereof, the apparent thickness is assumed to be the thickness between the upper and lower flat surfaces of the resin sheet.

When nonwoven fabric is employed as the resin sheet, the average pore size of the nonwoven fabric is preferably set in the range of 10 to 800 µm, for example. When the average pore size of the voids is in the range of 10 to 800 µm, bondability of the carbon material employed in the present invention tends to be excellent, and there is such a tendency that the carbon material bonded to the nonwoven fabric hardly slips off and a uniform sheet-shaped molding material is easily obtained. The average pore size of the voids is more preferably set to the range of 30 to 500 µm. The average pore size of the voids can be measured as the average of the diameters of circumscribed circles of the voids on the surface of the resin sheet obtained with a stereoscopic microscope, for example.

The surface density, i.e., the mass per unit area of the resin sheet is preferably set in the range of 5 to 300 g/m². If the surface density is at least 5 g/m², a sufficient quantity of the carbon material can be bonded to the resin sheet, the thickness accuracy of the sheet-shaped molding material is improved, and the mechanical strength of the sheet-shaped molding material is also improved. If the surface density is not more than 300 g/m², further, the resin sheet is not excessively increased in thickness but the electrical conductivity of the sheet-shaped molding material is improved. The surface density is more preferably set in the range of 5 to 50 g/m².

The thickness of the resin sheet is preferably set to the range of 5 to 300 µm. If the thickness is at least 5 µm, a sufficient quantity of the carbon material can be bonded to the resin sheet, the thickness accuracy of the sheet-shaped molding material is improved, and the mechanical strength of the sheet-shaped molding material is also improved. If the thickness is not more than 300 µm, the electrical conductivity of the sheet-shaped molding material is improved. The thickness is particularly preferably set to the range of 5 to 200 µm.

In the present invention, the aforementioned thermoplastic resin and/or the aforementioned thermosetting resin and conductive fiber may be used together as the materials constituting the resin sheet, particularly nonwoven fabric. The electrical conductivity and the mechanical strength of the fuel cell bipolar plate can be further improved by also using the conductive fiber.

Metallic fiber such as stainless steel fiber, PAN-based carbon fiber, pitch-based carbon fiber prepared from coal, petroleum pitch or naphthalene-based pitch, carbon fiber such as phenolic carbon fiber, rayon-based carbon fiber or carbon fiber formed by vapor phase growth, conductive polymeric fiber such as polyacetylene, polyphenylene, poypyrrol, polythiophene, polyaniline or polyacene, fiber prepared by vapor-depositing or plating metal to the surface of inorganic or organic fiber can be listed as the material for the aforementioned conductive fiber, and one of these materials or a combination of at least two types of these materials can be used.

While the fuel cell bipolar plate according to the present invention has the multilayer structure of the five layers including central layer A, inner layers B and B' and surface layers C and C', a laminated structure of at least seven layers may also be prepared by further providing different layers between central layer A and inner layers B and B' and/or between inner layer B and surface layer C and between inner layer B' and surface layer C' respectively, for example.

The fuel cell bipolar plate according to the present invention can be produced by the following process, for example. The case of producing the fuel cell bipolar plate with the aforementioned sheet-shaped molding material (1) is now described.

First, each of the sheet-shaped molding materials constituting the laminated molded item is prepared. Carbon particles such as graphite particles supplied from a hopper are sprinkled on one surface of a resin sheet on a sample support, and the thickness of the carbon particles is adjusted to a prescribed value by removing excess carbon particles with a squeegee. Then, the carbon particles and the resin sheet sprinkled with the carbon particles are pressed by a pair of heating rollers for obtaining a resin sheet to which the carbon particles are bonded, and the aforementioned resin sheet to which the carbon particles are bonded is fed onto a sample support including a cooling device, so that the resin sheet is cooled. Then, carbon particles not bonded to the resin sheet are removed, whereby the sheet-shaped molding material can be obtained. The removed carbon particles can be recovered and recycled.

When the sheet-shaped molding material (1) is prepared in the aforementioned method, the quantity of the carbon material bonded to the resin sheet can be adjusted in response to the particle diameter of the carbon particles, the design of the squeegee, the rolling pressure of the heating rollers, the heating temperature etc. Further, the carbon material content in the sheet-shaped molding material can be increased/decreased by adjusting the relation between the surface density, i.e., the mass per unit area of the resin sheet and the quantity of the carbon material bonded to the resin sheet. According to the present invention, a desired laminated molded item can be prepared by employing sheet-shaped molding materials having carbon contents increased/decreased in this manner as the central layer, the inner layers and the surface layers.

Then, the fuel cell bipolar plate according to the present invention can be formed by employing the sheet-shaped molding materials prepared in the aforementioned method as central layer A, inner layers B and B' and surface layers C and C'. First, the sheet-shaped molding materials constituting central layer A, inner layers B and B' and surface layers C and C' are stacked into the laminated structure of surface layer C/inner layer B/central layer A/inner layer B'/surface layer C' arranged in this sequence, and the laminated molded item employed in the present invention is formed by heating and pressure-molding the stacked sheet-shaped molding materials. If a multilayer structure is employed for at least any of central layer A, inner layers B and B' and surface layers C and C' in the present invention, the multilayer structure may be formed by stacking a plurality of the same type or different types of sheet-shaped materials in the aforementioned stacking.

Heating and pressure molding can be performed by a well-known method such as press molding employing a metal mold or stampable molding, for example. When thermoplastic resin is employed, for example, a method pressurizing the sheet-shaped molding materials to about 0.05 to 100 MPa at a temperature exceeding the melting point of the thermoplastic resin, press-molding the same for 10 to 200 seconds, and thereafter pressurizing the same to about 0.5 to 100 MPa at a temperature not more than the melting point of the thermoplastic resin for cold-pressing the same or the like can be employed. When thermosetting resin is employed, a method pressurizing the sheet-shaped molding materials to about 0.5 to 100 MPa in the vicinity of the curing temperature for the thermosetting resin and press-molding the same for 10 to 200 seconds or the like can be employed.

Figure 2:
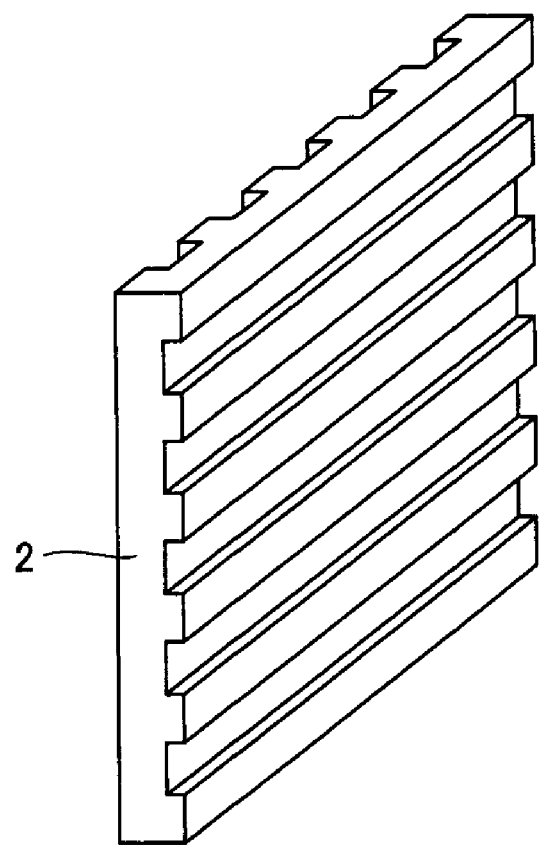
FIG. 2 is a diagram showing an example of the shape of the fuel cell bipolar plate according to the present invention.

FIG. 2 is a diagram showing an example of the shape of the fuel cell bipolar plate according to the present invention. A fuel cell bipolar plate such as the fuel cell bipolar plate 2 shown in FIG. 2 provided with ribs forming supply passages for gas or liquid on both surfaces or that provided with such ribs on a single surface can be listed as the fuel cell bipolar plate, and each shape can be employed for the fuel cell bipolar plate according to the present invention. The shape of the fuel cell bipolar plate can be arbitrarily designed by selecting the shape of the metal mold for forming the laminated molded item. If the fuel cell bipolar plate according to the present invention has the ribs shown in FIG. 2, for example, the carbon contents in the respective layers of the laminated molded item and the thicknesses of the respective layers described in this specification indicate values evaluated on planar portions provided with no ribs.

The fuel cell bipolar plate according to the present invention, formed by the laminate molded item of the sheet-shaped molding materials, is excellent in gas sealability.

Figure 3:
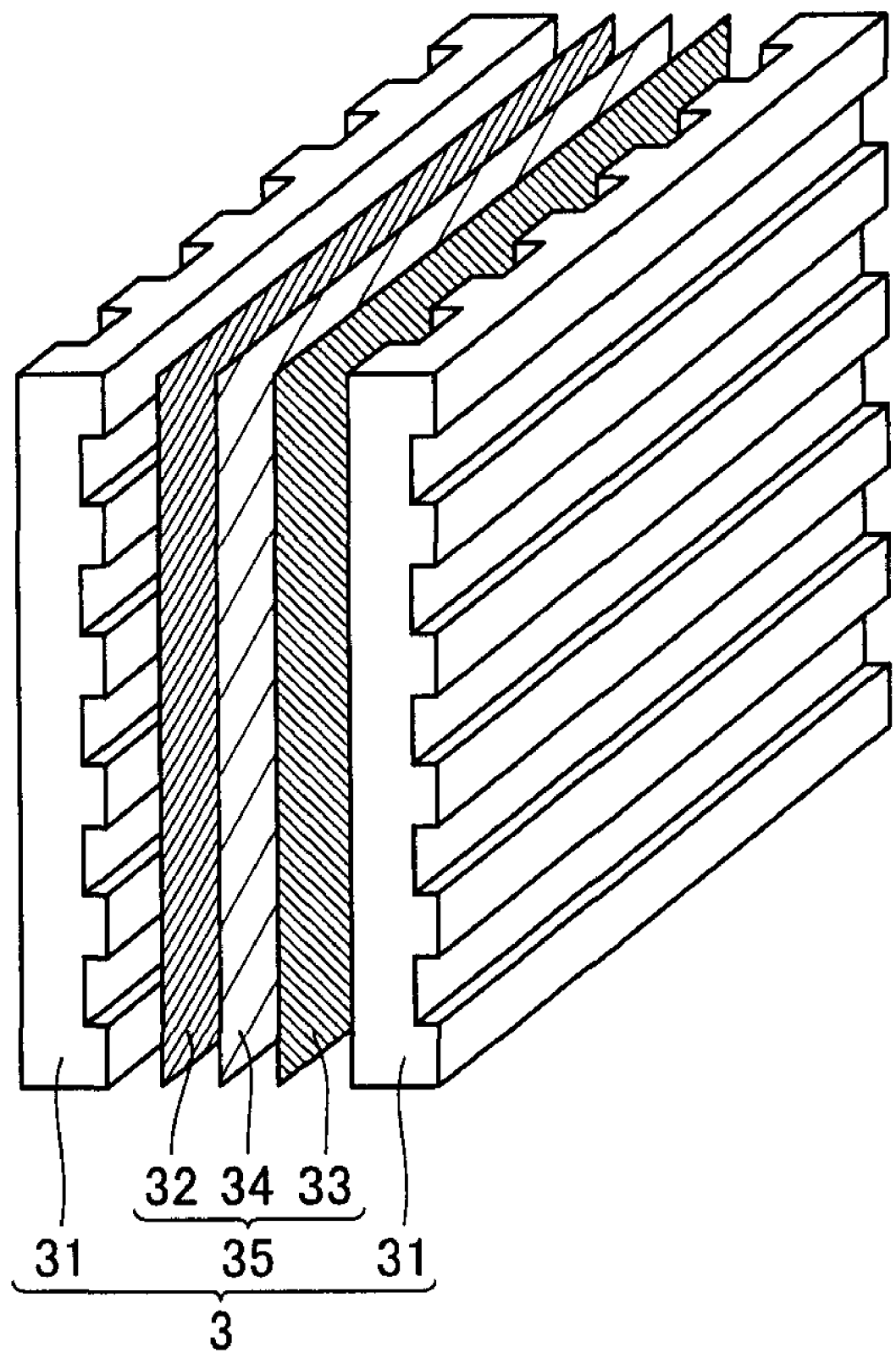
FIG. 3 is a diagram showing an example of the cell structure of a fuel cell according to the present invention.

A fuel cell can be formed with the fuel cell bipolar plate according to the present invention obtained in the aforementioned manner. FIG. 3 is a diagram showing an example of a cell structure of the fuel cell according to the present invention. Fuel cell bipolar plates 31 according to the present invention are arranged to hold an electrolyte membrane/electrode assembly 35 formed by a fuel electrode 32, an oxidizer electrode 33 an a solid polymer electrolyte membrane 34, for example, therebetween so that a solid polymer type fuel battery cell 3 can be formed. The fuel cell according to the present invention, also utilizable with single fuel battery cell 3, is generally provided in the form of a fuel cell stack in which a plurality of fuel battery cells 3 are serially arranged in order to improve power generation performance.

The fuel cell bipolar plate obtained in the present invention can be preferably applied to various fuel cells such as hydrazine type, direct methanol type, alkaline and phosphoric acid fuel cells, in addition to the aforementioned solid polymer type fuel cell.

The fuel cell according to the present invention prepared in the aforementioned process, excellent in electrical conductivity and mechanical strength and downsizeable due to thinning of the bipolar plate, can be preferably usable as a power source for an electric automobile, a portable power source or an emergency power source, or a power source for a mobile such as an artificial satellite, an airplane or a spacecraft, for example.

EXAMPLES

While the present invention is now described in more detail with reference to Examples, the present invention is not restricted to these.

(Preparation of Sheet-Shaped Molding Material 1)

After 10 g of graphite particles (artificial graphite) having an average particle diameter of 250 μm were sprinkled onto nonwoven fabric (surface density: 10 g/m$^2$, thickness: 65 μm, average void pore size: 38 μm, porosity: 85%) formed by polypropylene (hereinafter referred to as PP)/polyethylene (hereinafter referred to as PE) fiber of 150 mm by 150 mm, spacers of 0.8 mm in height were placed on both ends of the nonwoven fabric, and a squeegee was moved from an end of one of the spacers to an end of the other spacer thereby spreading the graphite particles to the overall surface of the nonwoven fabric.

Then, the aforementioned nonwoven fabric spread with the graphite particles was pressurized with press rollers previously heated to 140 to 160° C., partially melted for bonding the graphite particles thereto and naturally cooled, while graphite particles not bonded to the nonwoven fabric were thereafter removed by an air blow. A sheet-shaped molding material 1 having a thickness of 300 μm and surface density of 100 g/m$^2$ was obtained by the aforementioned method.

(Preparation of Sheet-Shaped Molding Material 2)

After 10 g of graphite particles (artificial graphite) having an average particle diameter of 150 μm were sprinkled onto nonwoven fabric (surface density: 20 g/m$^2$, thickness: 120 μm, average void pore size: 38 μm, porosity: 85%) formed by PP/PE fiber of 150 mm by 150 mm, spacers of 0.8 mm in height were placed on both ends of the nonwoven fabric, and a squeegee was moved from an end of one of the spacers to an end of the other spacer thereby spreading the graphite particles to the overall surface of the nonwoven fabric.

Then, the aforementioned nonwoven fabric spread with the graphite particles was pressurized with press rollers previously heated to 140 to 160° C., partially melted for bonding the graphite particles thereto and naturally cooled, while graphite particles not bonded to the nonwoven fabric were thereafter removed by an air blow. A sheet-shaped molding material 2 having a thickness of 250 μm and surface density of 80 g/m$^2$ was obtained by the aforementioned method.

(Preparation of Sheet-Shaped Molding Material 3)

After 10 g of graphite particles (artificial graphite) having an average particle diameter of 250 μm were sprinkled onto nonwoven fabric (surface density: 25 g/m$^2$, thickness: 150 μm, porosity: 85%) formed by poly(phenylene sulfide) resin (hereinafter referred to as PPS) fiber of 150 mm by 150 mm, spacers of 0.8 mm in height were placed on both ends of the nonwoven fabric, and a squeegee was moved from an end of one of the spacers to an end of the other spacer thereby spreading the graphite particles to the overall surface of the nonwoven fabric.

Then, the aforementioned nonwoven fabric spread with the graphite particles was pressurized with press rollers previously heated to 265 to 280° C., partially melted for bonding the graphite particles thereto and naturally cooled, while graphite particles not bonded to the nonwoven fabric were thereafter removed by an air blow. A sheet-shaped molding material 3 having a thickness of 320 μm and surface density of 165 g/m$^2$ was obtained by the aforementioned method.

(Preparation of Sheet-Shaped Molding Material 4)

After 10 g of graphite particles (artificial graphite) having an average particle diameter of 150 μm were sprinkled onto nonwoven fabric (surface density: 25 g/m², thickness: 150 μm, porosity: 85%) formed by PPS fiber of 150 mm by 150 mm, spacers of 0.8 mm in height were placed on both ends of the nonwoven fabric, and a squeegee was moved from an end of one of the spacers to an end of the other spacer thereby spreading the graphite particles to the overall surface of the nonwoven fabric.

Then, the aforementioned nonwoven fabric spread with the graphite particles was pressurized with press rollers previously heated to 265 to 280° C., partially melted for bonding the graphite particles thereto and naturally cooled, while graphite particles not bonded to the nonwoven fabric were thereafter removed by an air blow. A sheet-shaped molding material 4 having a thickness of 280 μm and surface density of 85 g/m² was obtained by the aforementioned method.

Examples 1 to 6 and Comparative Examples 1 to 12

Sheet-shaped molding materials shown in Table 1 or Table 4 prepared by the aforementioned methods were employed as resin sheets and carbon materials, for forming central layers, inner layers and surface layers. The center layers, the inner layers and the surface layers were formed by stacking the sheet-shaped materials shown in Table 1 or Table 4 by the numbers shown in Table 2 or Table 5 respectively.

The sheet-shaped molding materials obtained in the aforementioned methods were cut into 100 by 100 mm, and the sheet-shaped molding materials of the numbers shown in Table 2 or Table 5 were stacked into laminated structures of surface layer/inner layer/central layer/inner layer/surface layer arranged in this sequence as to Examples 1 to 6, in laminated structures of inner layer/central layer/inner layer arranged in this sequence as to comparative examples 1 to 4 and 7 to 10, laminated structures of only central layers as to comparative examples 5 and 11, and laminated structures of only inner layers as to comparative examples 6 and 12. Referring to Example 1, for example, one sheet-shaped molding material 1 (surface layer), eight sheet-shaped molding materials 2 (inner layers), 22 sheet-shaped molding materials 1 (central layers), eight sheet-shaped molding materials 2 (inner layers) and one sheet-shaped molding material 1 (surface layer) were stacked in this sequence.

Each of the laminates formed by stacking the sheet-shaped molding materials by these methods was introduced into a metal mold of the ordinary temperature, set in a heated pressing machine along with the metal mold, heated/pressurized to a prescribed temperature (PPS; 300° C., PP/PE; 185° C.) for melting the nonwoven fabric, thereafter immediately introduced into another cooling/pressing machine and cooled to a prescribed temperature (PPS; 150° C., PP/PE; 80° C.) with a pressure of 35.0 MPa, for forming a bipolar plate having ribs shown in FIG. 2 on both surfaces. The molding cycle for the bipolar plate was set to 120 seconds. This was regarded as the bipolar plate according to each of Examples and comparative examples.

Differently from the aforementioned preparation of the bipolar plate, a flat laminated molded item having a length of 100 mm, a width of 100 mm and a thickness of 2.2 to 3.0 mm was prepared from sheet-shaped molding materials obtained in the aforementioned methods by an operation similar to the above except that the shape of the metal mold was changed, to form a test molded item. This test molded item was employed for measuring the carbon material contents, the thicknesses of the respective layers, the volume resistivity and the bending strength.

<Carbon Material Contents in Layers in Laminated Molded Item>

Five samples for cross-sectional shape observation were obtained from the flat test molded item obtained in the above, and the sectional shapes of the samples were observed with an optical microscope [by Keyence Corporation]. Sectional shape images were analyzed with image analysis software [by Planeton Ltd.] for calculating the ratios (area %) of areas of graphite particle portions occupying the observation fields of central layers, inner layers and surface layers respectively, and these values were regarded as the graphite particle contents (volume %) in the sheet-shaped molding materials constituting the central layers, the inner layers and the surface layers respectively. Tables 1 and 4 show the results.

<Thicknesses of Layers in Laminated Molded Item>

The samples for sectional shape observation obtained from the flat test molded item obtained in the above were employed for observing sectional shapes similarly to the above while a scale set on the optical microscope was employed for measuring the thicknesses of the central layers, the inner layers and the surface layers respectively. Tables 3 and 6 show the results.

<Bending Strength of Laminated Molded Item>

A test piece having a length of 70 mm, a width of 25 mm and a thickness of 2.2 to 3.0 mm cut out from the flat test molded item obtained in the above was employed for measuring bending strength according to JIS K-6911. Tables 3 and 6 show the results.

<Volume Resistivity of Laminated Molded Item>

A test piece having a length of 80 mm, a width of 50 mm and a thickness of 2.2 to 3.0 mm cut out from the flat test molded item obtained in the above was employed for measuring volume resistivity (unit: mΩ·cm) according to JIS C-2525-1999. Tables 3 and 6 show the results.

TABLE 1

| Sheet-Shaped Molding Material No. | Nonwoven Fabric | | | Graphite Particles [note 2] | | Sheet-Shaped Molding Material | |
|---|---|---|---|---|---|---|---|
| | Material | Surface Density (g/m²) | Thickness (μm) | Average Particle Diameter (μm) | Content (wt %) [vol %] | Surface Density (g/m²) | Thickness (μm) |
| 1 | PP/PE [note 1] | 10 | 65 | 250 | 90 [78] | 100 | 300 |
| 2 | PP/PE [note 1] | 20 | 120 | 150 | 75 [55] | 80 | 250 |

[note 1] PP/PE denotes fiber having a core of polypropylene and a sheath of polyethylene.
[note 2] Graphite particles are made of artificial graphite.

TABLE 2

| | | Sheet-Shaped Molding Material No. | | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|
| Mode of Lamination (each numeral in Table denotes number of layers) | 5 Layers | Surface Layer | 1 | 1 | 2 | 3 | — | — | — | — | — | — |
| | | Inner Layer | 2 | 8 | 8 | 8 | — | — | — | — | — | — |
| | | Central Layer | 1 | 22 | 20 | 18 | — | — | — | — | — | — |
| | | Inner Layer | 2 | 8 | 8 | 8 | — | — | — | — | — | — |
| | | Surface Layer | 1 | 1 | 2 | 3 | — | — | — | — | — | — |
| | 3 Layers | Surface Layer | 2 | — | — | — | 4 | 8 | 12 | — | — | — |
| | | Central Layer | 1 | — | — | — | 30 | 24 | 18 | — | — | — |
| | | Surface Layer | 2 | — | — | — | 4 | 8 | 12 | — | — | — |
| | | Surface Layer | 1 | — | — | — | — | — | — | 15 | — | — |
| | | Central Layer | 2 | — | — | — | — | — | — | 8 | — | — |
| | | Surface Layer | 1 | — | — | — | — | — | — | 15 | — | — |
| | 1 Layer | | 1 | — | — | — | — | — | — | — | 38 | — |
| | | | 2 | — | — | — | — | — | — | — | — | 42 |

TABLE 3

| | | Sheet-Shaped Molding Material No. | | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|
| Thickness of Layer (mm) | 5 Layers | Surface Layer | 1 | 0.05 | 0.1 | 0.15 | — | — | — | — | — | — |
| | | Inner Layer | 2 | 0.4 | 0.4 | 0.4 | — | — | — | — | — | — |
| | | Central Layer | 1 | 1.3 | 1.2 | 1.1 | — | — | — | — | — | — |
| | | Inner Layer | 2 | 0.4 | 0.4 | 0.4 | — | — | — | — | — | — |
| | | Surface Layer | 1 | 0.05 | 0.1 | 0.15 | — | — | — | — | — | — |
| | 3 Layers | Surface Layer | 2 | — | — | — | 0.2 | 0.4 | 0.55 | — | — | — |
| | | Central Layer | 1 | — | — | — | 1.8 | 1.4 | 1.1 | — | — | — |
| | | Surface Layer | 2 | — | — | — | 0.2 | 0.4 | 0.55 | — | — | — |
| | | Surface Layer | 1 | — | — | — | — | — | — | 0.9 | — | — |
| | | Central Layer | 2 | — | — | — | — | — | — | 0.4 | — | — |
| | | Surface Layer | 1 | — | — | — | — | — | — | 0.9 | — | — |
| | 1 Layer | | 1 | — | — | — | — | — | — | — | 2.2 | — |
| | | | 2 | — | — | — | — | — | — | — | — | 2.2 |
| Bending Strength (MPa) | | | | 31 | 31 | 30 | 28 | 31 | 32 | 25 | 25 | 35 |
| Volume Resistivity (mΩ·cm) | | | | 8.6 | 8.1 | 7.5 | 12 | 14 | 15 | 11 | 5.2 | 22.5 |

TABLE 4

| Sheet-Shaped Molding Material No. | Nonwoven Fabric | | | Graphite Particles [note 2] | | Sheet-Shaped Molding Material | |
|---|---|---|---|---|---|---|---|
| | Material | Surface Density (g/m$^2$) | Thickness (μm) | Average Particle Diameter (μm) | Content (wt %) [vol %] | Surface Density (g/m$^2$) | Thickness (μm) |
| 3 | PPC [note 3] | 25 | 150 | 250 | 85 [78] | 165 | 320 |
| 4 | PPC [note 3] | 25 | 150 | 150 | 70 [55] | 85 | 280 |

[note 3] PPS denotes poly(phenylene sulfide) fiber.

TABLE 5

| | | Sheet-Shaped Molding Material No. | | Example 4 | Example 5 | Example 6 | Comparative Example 7 | Comparative Example 8 | Comparative Example 9 | Comparative Example 10 | Comparative Example 11 | Comparative Example 12 |
|---|---|---|---|---|---|---|---|---|---|---|---|---|
| Mode of Lamination (each numeral in Table denotes number of layers) | 5 Layers | Surface Layer | 3 | 1 | 2 | 3 | — | — | — | — | — | — |
| | | Inner Layer | 4 | 8 | 8 | 8 | — | — | — | — | — | — |
| | | Central Layer | 3 | 22 | 20 | 18 | — | — | — | — | — | — |
| | | Inner Layer | 4 | 8 | 8 | 8 | — | — | — | — | — | — |
| | | Surface Layer | 3 | 1 | 2 | 3 | — | — | — | — | — | — |
| | 3 Layers | Surface Layer | 4 | — | — | — | 4 | 8 | 12 | — | — | — |
| | | Central Layer | 3 | — | — | — | 30 | 24 | 18 | — | — | — |
| | | Surface Layer | 4 | — | — | — | 4 | 8 | 12 | — | — | — |
| | | Surface Layer | 3 | — | — | — | — | — | — | 15 | — | — |
| | | Central Layer | 4 | — | — | — | — | — | — | 8 | — | — |
| | | Surface Layer | 3 | — | — | — | — | — | — | 15 | — | — |
| | 1 Layer | | 3 | — | — | — | — | — | — | — | 38 | — |
| | | | 4 | — | — | — | — | — | — | — | — | 42 |

TABLE 6

| | | Sheet-Shaped Molding Material No. | | Example 4 | Example 5 | Example 6 | Comparative Example 7 | Comparative Example 8 | Comparative Example 9 | Comparative Example 10 | Comparative Example 11 | Comparative Example 12 |
|---|---|---|---|---|---|---|---|---|---|---|---|---|
| Thickness of Layer (mm) | 5 Layers | Surface Layer | 1 | 0.1 | 0.2 | 0.3 | — | — | — | — | — | — |
| | | Inner Layer | 2 | 0.55 | 0.55 | 0.55 | — | — | — | — | — | — |
| | | Central Layer | 1 | 1.7 | 1.5 | 1.3 | — | — | — | — | — | — |
| | | Inner Layer | 2 | 0.55 | 0.55 | 0.55 | — | — | — | — | — | — |
| | | Surface Layer | 1 | 0.1 | 0.2 | 0.3 | — | — | — | — | — | — |
| | 3 Layers | Surface Layer | 2 | — | — | — | 0.3 | 0.55 | 0.8 | — | — | — |
| | | Central Layer | 1 | — | — | — | 2.4 | 1.9 | 1.4 | — | — | — |
| | | Surface Layer | 2 | — | — | — | 0.3 | 0.55 | 0.8 | — | — | — |
| | | Surface Layer | 1 | — | — | — | — | — | — | 1.2 | — | — |
| | | Central Layer | 2 | — | — | — | — | — | — | 0.6 | — | — |
| | | Surface Layer | 1 | — | — | — | — | — | — | 1.2 | — | — |
| | 1 Layer | | 1 | — | — | — | — | — | — | — | 3.0 | — |
| | | | 2 | — | — | — | — | — | — | — | — | 3.0 |
| Bending Strength (MPa) | | | | 58 | 58 | 56 | 53 | 57 | 60 | 50 | 50 | 64 |
| Volume Resistivity (mΩ · cm) | | | | 7.4 | 7.0 | 6.5 | 11 | 13 | 14 | 11 | 4.5 | 18.5 |

While the same materials were employed in Examples 1 to 3 and comparative examples 1 to 6 as the resin sheets and the carbon materials, all of Examples 1 to 3 exhibit excellent values in the balance between the bending strength and the volume resistivity as compared with comparative examples 1 to 4 provided with the central layers and the surface layers holding the central layers therebetween, comparative example 5 provided with only the layer corresponding to the central layer of the present invention and comparative example 6 provided with only the layer corresponding to the inner layer of the present invention. While the thicknesses of the overall bipolar plates were identical to each other in Examples 1 to 3, Example 3, Example 2 and Example 1 exhibit low volume resistivity values in this sequence, whereby it is understood that electrical conductivity is improved by increasing the thicknesses of the surface layers. On the other hand, the bending strength values were identical to each other in Example 1 and Example 2 while Example 3 exhibited a value slightly smaller than the same, whereby it is understood that the layer structure of the laminated molded item can be properly adjusted in response to the desired balance between the bending strength and the volume resistivity.

Particularly when comparing Examples 1 to 3 and comparative example 2 with each other, the total thicknesses of the sheet-shaped molding materials 1 in Examples 1 to 3 and the thicknesses of the sheet-shaped molding materials 1 in comparative example 2 were equalized to each other while the total thicknesses of the sheet-shaped molding materials 2 were equalized to each other in Examples 1 to 3 and comparative example 2. In Examples 1 to 3 and comparative example 2, the material compositions of the overall bipolar plates were identical to each other. In Examples 1 to 3, however, bending strength values substantially equivalent to that of comparative example 2 were observed, while the volume resistivity values were remarkably reduced. It is understood from these results that the electrical conductivity and the mechanical strength can be rendered highly compatible with each other by employing the laminated structure of the present invention regardless of the material composition of the overall bipolar plate.

Also in Examples 4 to 6 and comparative examples 7 to 12, it is understood that all of Examples 4 to 6 exhibit excellent values in the balance between the bending strength and the volume resistivity as compared with comparative examples 7 to 10 provided with the central layers and the surface layers holding the central layers therebetween, comparative example 11 provided with only the layer corresponding to the central layer of the present invention and comparative example 12 provided with only the layer corresponding to the inner layer of the present invention. Tendencies similar to those of Examples 1 to 3 are observed also in Examples 4 to 6 such that the electrical conductivity was improved by increasing the thicknesses of the surface layers and the bending strength values were identical to each other in Example 4 and Example 5 while Example 6 exhibited a value slightly smaller than the same, whereby it is also understood from these results that the layer structure of the laminated molded item can be properly adjusted in response to desired balance between the bending strength and the volume resistivity in the present invention.

In comparison between Examples 4 to 6 and comparative example 8, tendencies similar to those in the comparison between Examples 1 to 3 and comparative example 2 were observed such that bending strength values substantially equivalent to that of comparative example 8 were observed while volume resistivity values were remarkably reduced in Examples 4 to 6. It is also understood from these results that the electrical conductivity and the mechanical strength can be rendered highly compatible with each other by employing the laminated structure according to the present invention, regardless of the material composition of the overall bipolar plate.

In Examples 1 to 6, neither blistering nor delamination of the bipolar plates was recognized in observation of the sectional shapes similarly to comparative examples 1 to 12, whereby it is understood that adhesiveness between the central layer, the inner layers and the surface layers is excellent in the fuel cell bipolar plate according to the present invention.

INDUSTRIAL APPLICABILITY

The fuel cell bipolar plate according to the present invention has excellent electrical conductivity while retaining mechanical strength, and a lightweight fuel cell having high reliability including the same can be effectively used as a fuel cell for a portable cell, a power source for an automobile or an emergency power source.

The invention claimed is:

1. A fuel cell bipolar plate comprising a laminated molded item formed by a sheet-shaped molding material, wherein
said sheet-shaped molding material contains resin and a carbon material,
said laminated molded item has a laminated structure of surface layer C/inner layer B/central layer A/inner layer B'/surface layer C' arranged in this sequence,
each of said central layer A, said inner layer B, said inner layer B', said surface layer C, and said surface layer C' consists of a single layer or a multilayer of said sheet-shaped molding material, and
the carbon material content a in said central layer A, the carbon material content b in said inner layer B, the carbon material content b' in said inner layer B', the carbon material content c in said surface layer C and the carbon material content said surface layer C' satisfy the following relationships:

$55 \leq a \leq 85$ $55 \leq c \leq 85$ $55 \leq c' \leq 85$ $10 \leq a-b \leq 30$ $10 \leq c-b \leq 30$ $10 \leq a-b' \leq 30$ $10 \leq c'-b' \leq 30$ (where the unit of a, b, b', c and c' is volume %).

2. The fuel cell bipolar plate according to claim 1, wherein the carbon material content a in said central layer A, the carbon material content c in said surface layer C and the carbon material content c' in said surface layer C' satisfy the following relationships:

$0 \leq c-a$ $0 \leq c'-a$.

3. The fuel cell bipolar plate according to claim 1, wherein the thicknesses of both of said surface layer C and said surface layer C' are in the range of 1/40 to 1/5 of the thickness of said laminated molded item.

4. The fuel cell bipolar plate according to claim 1, wherein the thicknesses of both of said surface layer C and said surface layer C' are in the range of 1/20 to 1/10 of the thickness of said laminated molded item.

5. The fuel cell bipolar plate according to claim 1, wherein the thicknesses of both of said inner layer B and said inner layer B' are in the range of 1/20 to 2/5 of the thickness of said laminated molded item.

6. The fuel cell bipolar plate according to claim 1, wherein said sheet-shaped molding material is prepared by forming a carbon particle layer on at least one surface of a resin sheet.

7. A fuel cell including the fuel cell bipolar plate according to claim 1 or 2.

8. A process for producing a fuel cell bipolar plate for obtaining the fuel cell bipolar plate according to claim 1 or 2, including the steps of:
stacking sheet-shaped molding materials constituting the respective ones of said central layer A, said inner layers B and B' and said surface layers C and C' into a laminated structure of surface layer C/inner layer B/central layer A/inner layer B'/surface layer C' arranged in this sequence; and
forming said laminated molded item by heating and pressure-molding said stacked sheet-shaped molding materials.

9. A fuel cell including the fuel cell bipolar plate obtained by the process according to claim 8.

* * * * *